(Model.)
M. T. GEREN.
Ear for Earthenware Vessels.
No. 239,484. Patented March 29, 1881.
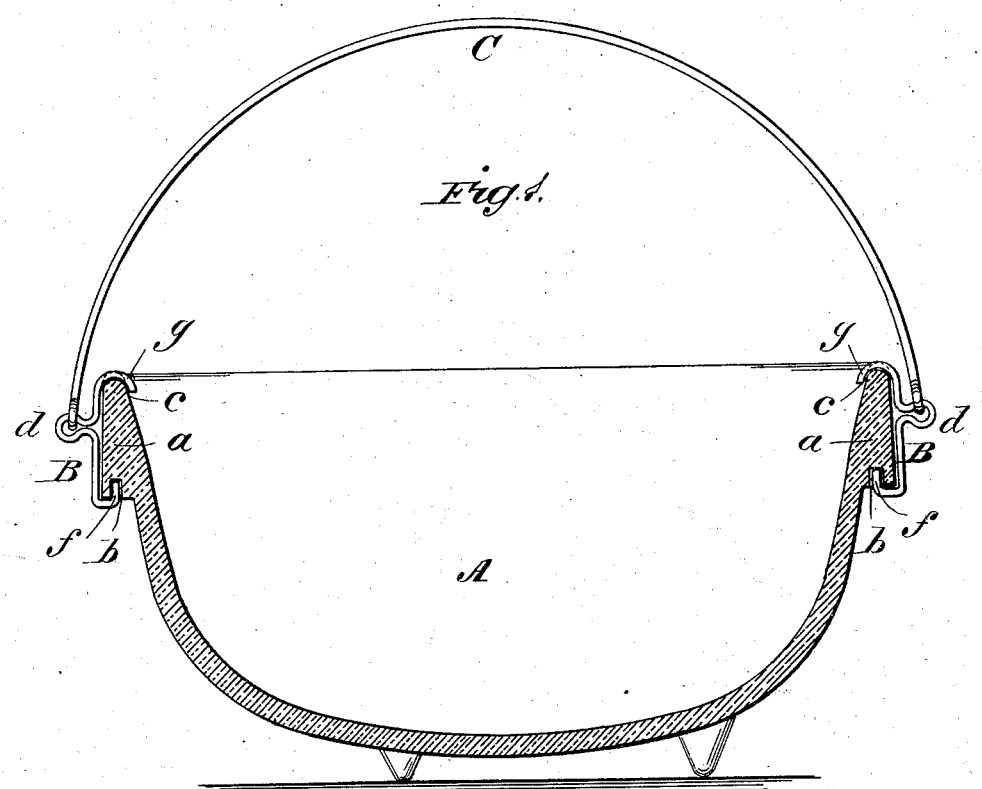
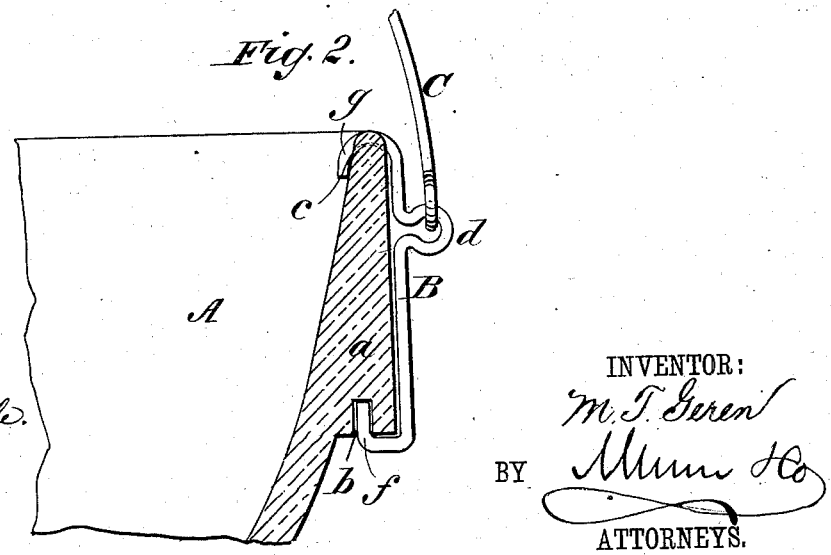
WITNESSES:
F. McArdle.
C. Sedgwick
INVENTOR:
M. T. Geren
BY Munn & Co
ATTORNEYS.
N. PETERS, PHOTO-LITHOGRAPHER, WASHINGTON, D. C.

UNITED STATES PATENT OFFICE.

MILTON T. GEREN, OF NEW BRIGHTON, PENNSYLVANIA.

EAR FOR EARTHENWARE VESSELS.

SPECIFICATION forming part of Letters Patent No. 239,484, dated March 29, 1881.

Application filed August 14, 1880. (Model.)

*To all whom it may concern:*

Be it known that I, MILTON T. GEREN, of New Brighton, in the county of Beaver and State of Pennsylvania, have invented a new and Improved Ear for Earthenware Vessels, of which the following is a specification.

The object of this invention is to provide a cheap and strong ear for earthen pots and pans, and to attach it so that it shall not interfere with the cover, and so that the strain upon it shall not break it loose from its fastening.

Figure 1 is a sectional elevation of an earthen vessel with the improved ears attached. Fig. 2 is an enlarged sectional elevation of a portion of an earthen vessel, showing an ear attach thereto.

Similar letters of reference indicate corresponding parts.

In the drawings, A represents the earthen vessel, provided with projecting rim $a$, at opposite points of which, and in the under side thereof, are formed the vertical sockets $b$ $b$, while directly above these sockets $b$ $b$ grooves $c$ $c$ are formed in the edge of the vessel.

B is the ear, consisting of a piece of wire having an eye or loop, $d$, formed near its center for the reception of an end of the bail C, and having one end, $f$, bent up at right angles and entered into a socket, $b$, and its upper end, $g$, secured over and into a groove, $c$, formed in the edge of the vessel A, whereby said ear is firmly held in position. On the opposite side of the vessel A a like ear, B, is similarly attached.

Ordinarily lugs are formed on earthen vessels for attachment or engagement of the bail; but these lugs sooner or later break off in use.

The advantages of this improved device are that it is not easily broken from the vessel or pan, and that these ears will not come in contact with each other when the vessels or pans are packed together; also, any cover may be used over the vessel without interference with them.

Having thus described my invention, what I claim as new, and desire to secure by Letters Patent, is—

The combination, with the ear B, provided with bail-loop $d$, rectangular bent end $f$, and curved bent end $g$, of the vessel A, provided with rim $a$, having vertical sockets $b$ $b$ and rim-grooves $c$ $c$, substantially as herein shown and described.

MILTON THOMAS GEREN.

Witnesses:
 BENJ. WILDE,
 H. S. MCCONNEL.